United States Patent [19]

Chen

[11] Patent Number: 5,546,627
[45] Date of Patent: Aug. 20, 1996

[54] ADJUSTABLE LENGTH WINDSHIELD WIPER

[76] Inventor: Liang-Yuan Chen, 180, Hsinmin St., Tamshui, Taipei Hsien, Taiwan

[21] Appl. No.: 575,385

[22] Filed: Dec. 20, 1995

[51] Int. Cl.⁶ ............................... B60S 1/38; B60S 1/04
[52] U.S. Cl. ................................. 15/250.39; 15/250.46; 15/250.454; 15/250.44
[58] Field of Search ................ 15/250.39, 250.31, 15/250.361, 250.41, 250.43, 250.44, 250.46, 250.48, 250.23, 250.454

[56] References Cited

U.S. PATENT DOCUMENTS

| | | | |
|---|---|---|---|
| 2,663,043 | 12/1953 | Oishei | 15/250.43 |
| 2,713,695 | 7/1955 | Oishei | 15/250.39 |
| 3,846,864 | 11/1974 | Baut et al. | 15/250.46 |
| 3,922,749 | 12/1975 | Castleman, Jr. et al. | 15/250.46 |
| 3,969,784 | 7/1976 | Journée | 15/250.46 |
| 4,547,925 | 10/1985 | Blackborow et al. | 15/250.39 |
| 5,228,167 | 7/1993 | Yang | 15/250.39 |
| 5,233,721 | 8/1993 | Yang | 15/250.46 |

*Primary Examiner*—Gary K. Graham
*Attorney, Agent, or Firm*—Morton J. Rosenberg; David I. Klein

[57] ABSTRACT

A windshield wiper including an outer elongated frame having a top and two vertical sides, a pair of extension arms being a generally inverted U-shaped member having two parallel depending legs each formed with a plurality of holes, the arms are slidably received in opposite ends of the outer frame, a pair of angled positioners each having an upper plate and a vertical plate, the positioners for fixing the arms with respect to the outer frame, a pair of intermediate elongated frames each provided at an intermediate portion thereof with a first axle engaged with the extension arm, a pair of inner elongated frames each provided at an intermediate portion thereof with a second axle engaged with the intermediate elongated frame, and a wiper blade having two opposite grooves engaged with the intermediate elongated frames and the inner elongated frames, whereby the windshield wiper can be adjusted in length by manipulation of said positioner.

4 Claims, 5 Drawing Sheets

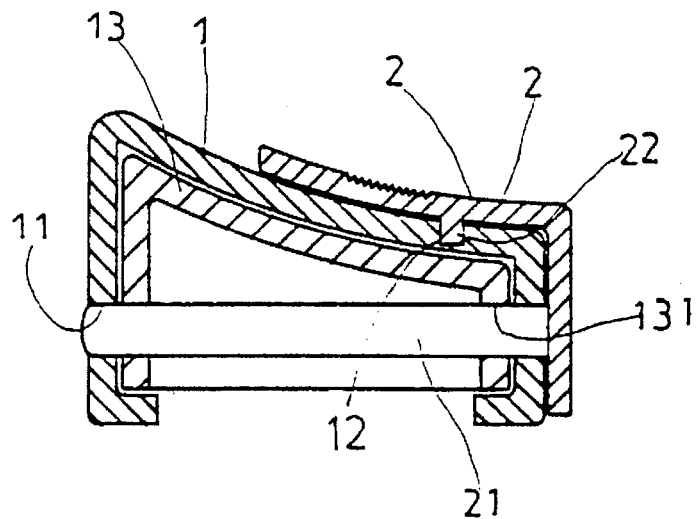
F I G. 3A
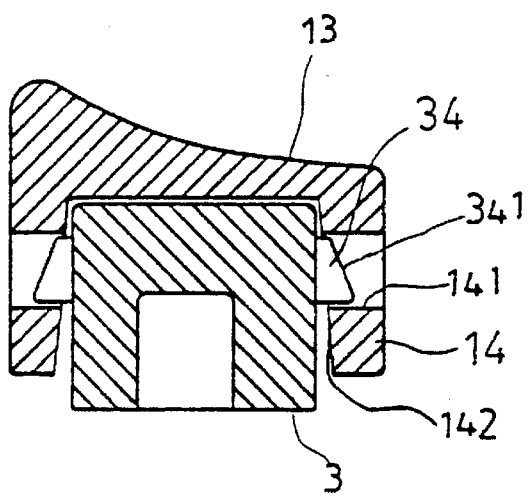
F I G. 3B

5,546,627

ADJUSTABLE LENGTH WINDSHIELD WIPER

BACKGROUND OF THE INVENTION

1. Field of the Invention

This invention relates to a windshield wiper which is adjustable in length.

2. Description of the Prior Art

It has been found that the conventional windshield wiper is fixed in length thereby making it necessary to prepare a number of molds in order to manufacture windshield wipers with different length and therefore, increasing the cost thereof. Hence, an adjustable windshield wiper has been developed to obviate this drawback. Nevertheless, such an adjustable windshield wiper is sophisticated in structure and difficult to assemble thus making it unfit for practical use.

Therefore, it is an object of the present invention to provide an adjustable windshield wiper which can obviate and mitigate the above-mentioned drawbacks.

SUMMARY OF THE INVENTION

This invention relates to an improved adjustable windshield wiper.

It is the primary object of the present invention to provide a windshield wiper which can be adjusted in length as required.

It is another object of the present invention to provide a windshield wiper which is simple and sturdy in construction.

It is still another object of the present invention to provide a windshield wiper which is low in cost.

It is still another object of the present invention to provide a windshield wiper which is easy and cheap to manufacture.

It is a further object of the present invention to provide a windshield wiper which can be quickly assembled.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 3A is a sectional view taken along line 3A—3A of FIG. 2;

FIG. 3B is a sectional view taken along line 3B—3B of FIG. 2; and

DETAILED DESCRIPTION OF THE PREFERRED EMBODIMENT

Figure 1:
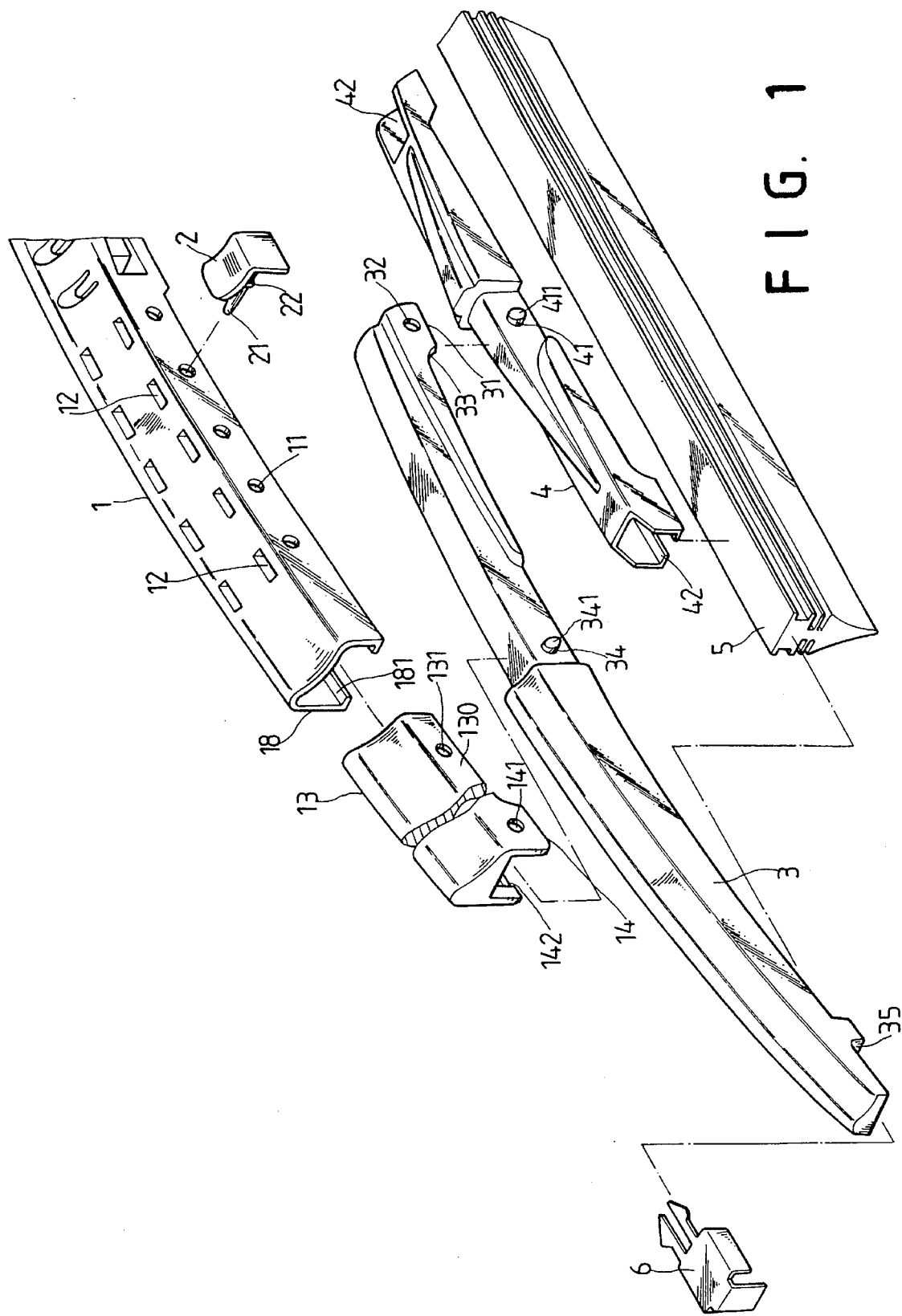
FIG. 1 is an exploded view of the present invention.

For the purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
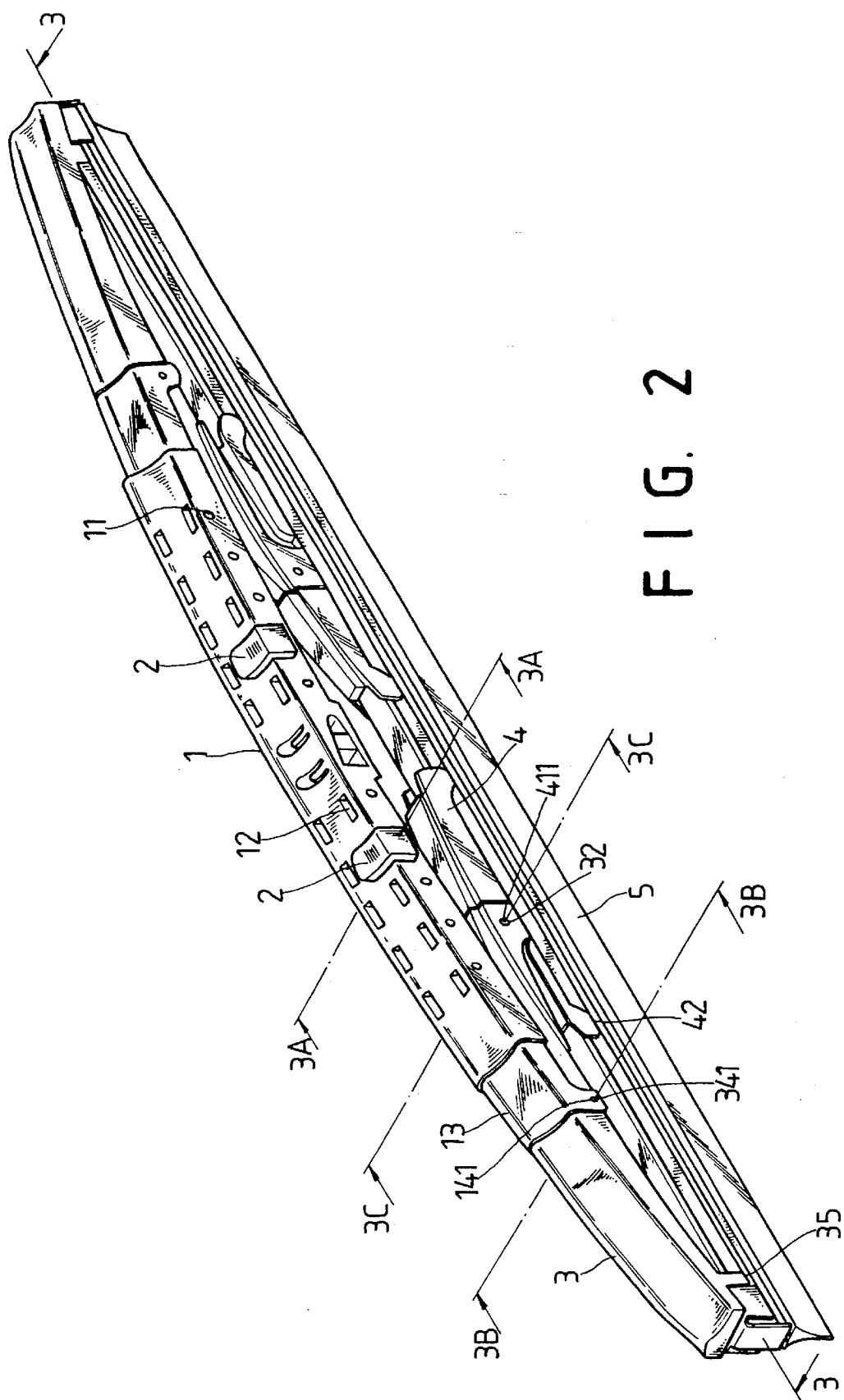
FIG. 2 is a perspective view of the present invention.
Figure 3:
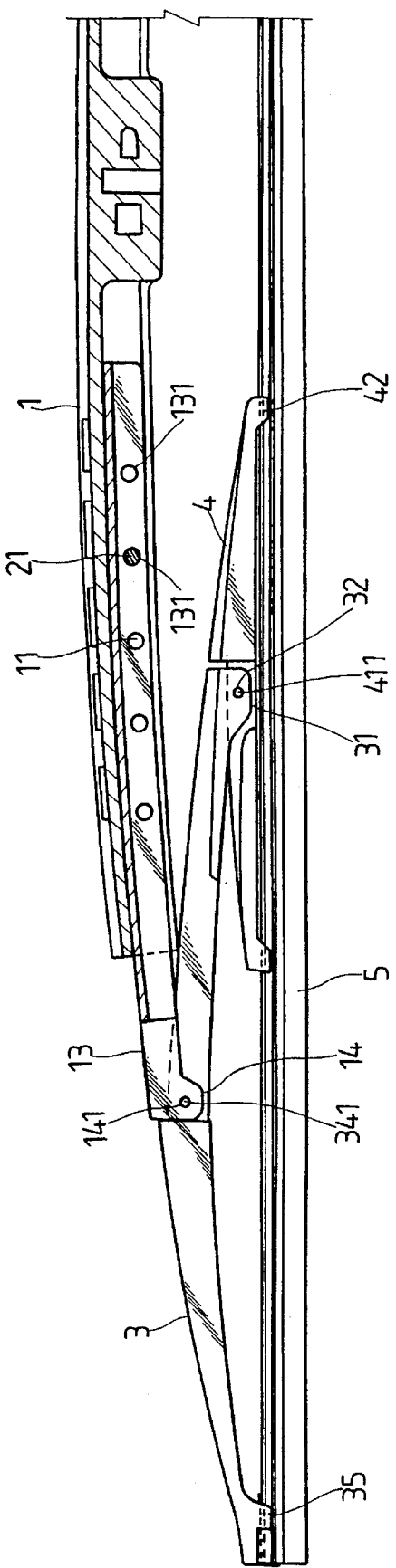
FIG. 3 is a sectional view of the present invention.
Figure 3C:
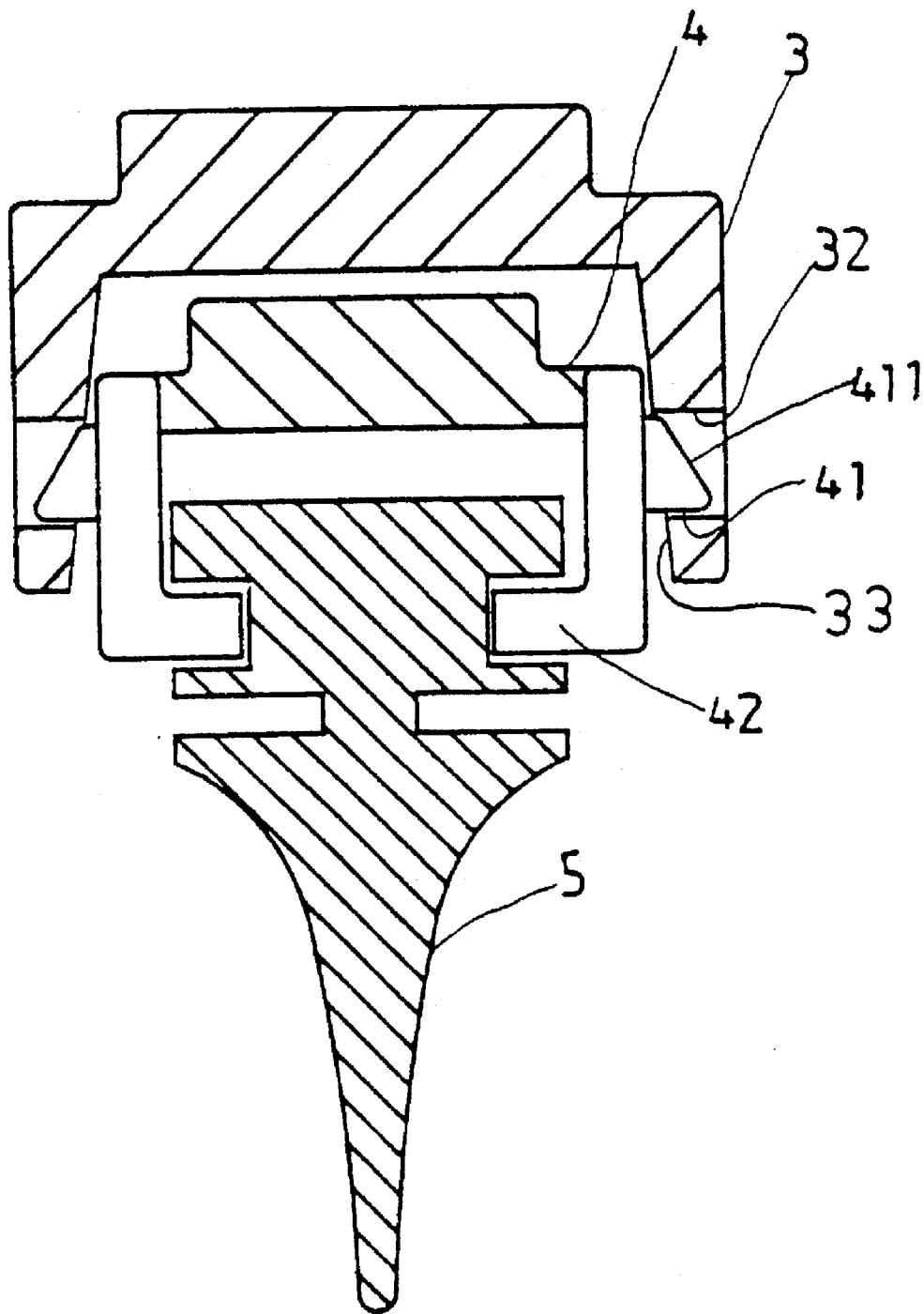
FIG. 3C is a sectional view taken along line 3C—3C of FIG. 2.

With reference to the drawings and in particular to FIGS. 1, 2 and 3 thereof, the adjustable windshield wiper according to the present invention mainly comprises an outer frame 1, a pair of positioners 2, a pair of extension arms 13, a pair of intermediate frames 3, a pair of inner frames 4 and a wiper blade 5.

The outer frame 1 is an elongated member having first and second end portions, said frame has an open bottom, and is formed with a plurality of slots 12 on a top wall and a plurality of holes 11 extending through its two vertical opposite side walls 18. Each of the vertical opposite sides 18 has a flange 181 extending inwardly therefrom.

The extension arms 13 are a generally inverted U-shaped member which has two parallel depending legs 130 each formed with a plurality of holes 131. Each of the extension arms 13 are inserted into a respective end of the outer frame 1, with its legs 130 supported by the flanges 181 of the outer frame 1. The extension arm 13 is formed at an end with a pair of depending lugs 14 each having a hole 141. The lug 14 has an inclined surface 142 at its inner side so that its upper portion is larger than its lower portion in thickness. Furthermore, the extension arm 13 is formed with a plurality of holes 131 along its length.

The positioner 2 is an angular member having a upper plate and a side plate, the former having a protuberance 22 depending from a lower surface thereof while the latter having a shaft 21 extending horizontally outwardly from an inner surface thereof (see FIG. 3A).

The extension arm 13 is fixedly engaged with the outer frame 1 by the positioners 2, with the protuberances 22 of the positioners 22 engaged with the slots 12 of the outer frame and the shafts 21 going through the holes 11 of the outer frame 1 and the holes 131 of the extension arm 13.

The intermediate frames 3 are also elongated in shape and are connected with respective extension arms 13. The intermediate frame 3 is provided at an intermediate portion with two axles 34, one at a vertical side thereof. The axle 34 has an end formed with an inclined surface 341. Further, the intermediate frame 3 is provided close to an outer end thereof with a pair of depending ears each formed with a flange 35 extending inwardly therefrom and at an inner end thereof with a pair of depending lugs 31 each having a hole 32. Each of the lugs 31 has an inclined surface 33 at its inner surface so that its upper portion is larger than its lower portion in thickness. The intermediate frame 3 is engaged with the extension arm 13 by forcing the axles 34 of the former into the holes 141 of the latter (see FIG. 3B).

The inner frames 4 are each provided at an intermediate portion thereof with an axle 41 having an inclined surface 411 at the end. The inner frame 4 is engaged with the intermediate frame 3 by forcing the axles 41 of the former into the holes 32 of the latter. Both ends of the inner frame 4 is provided with a pair of opposed flanges 42

The wiper blade 5 has two opposite grooves engaged with the flanges 42 of the inner frames and the flanges 35 of the intermediate frames 3. In addition, each end of the wiper blade 5 is engaged with a cap 6.

When desired to adjust the length of the windshield wiper according to the present invention, the positioners 2 are first disengaged from the outer frame 1 and then the extension arms 13 are moved to the desired positions within the outer frame 1 and kept in fixed positions by engaging the positioners 2 with the outer frame 1.

The invention is naturally not limited in any sense to the particular features specified in the forgoing or to the details of the particular embodiment which has been chosen in order to illustrate the invention.

Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An adjustable length windshield wiper comprising:

an outer elongated frame including first and second end portions, each end portion of said outer frame having a top wall with two laterally spaced side walls depending therefrom, each of said side walls being formed with a flange, said flanges of said respective end portions extending towards one another, said top walls each having a plurality of slots therein and said side walls each having a plurality of holes therein;

a pair of elongated extension arms, each said arm being of a generally inverted U-shaped form in transverse cross-section, said arms each having two parallel depending legs, each leg formed with a plurality of holes therein, inner ends of said extension arms being inserted, respectively, into said ends of said outer elongated frame between said side walls with said legs supported by said flanges, each said extension arm being provided at an outer end with a pair of first depending lugs, each lug having a hole therein;

a pair of positioners, each positioner having an upper plate with a side plate joined thereto, each said upper plate being provided with a protuberance extending from a lower surface thereof, each said side plate being provided with a shaft extending outwardly from an inner surface thereof, said positioners respectively couple the extension arms with the first and second end portions of said outer frame, said protuberances respectively engage one of said slots and said shafts respectively engage both a pair of said holes in said side walls and a pair of said holes in said legs to thereby respectively fix the extension arms with respect to the outer frame;

a pair of intermediate elongated frames respectively coupled with said pair of extension arms, each intermediate frame provided at an intermediate portion thereof with an axle engaged with the holes in the respective pairs of lugs, said intermediate elongated frames each being provided close to an outer end thereof with two depending ears, each ear formed with a flange, said flanges on respective ends of said intermediate frames extending towards one another and an inner end of each said intermediate frame provided with a pair of second depending lugs, each lug having a hole therein;

a pair of inner elongated frames respectively coupled with said pair of intermediate elongated frames, each inner frame provided at an intermediate portion thereof with an axle engaged with the holes in the respective second depending lugs, said inner elongated frames each being provided at first and second ends thereof with a pair of flanges, each said pair of flanges extending towards one another; and an elongated wiper blade having two opposite longitudinal grooves engaged respectively with said pairs of flanges of each inner and intermediate frame.

2. The adjustable length windshield wiper as claimed in claim 1, wherein each said intermediate frame axle has an end formed with an inclined surface.

3. The adjustable length windshield wiper as claimed in claim 1, wherein each said inner frame axle has an end formed with an inclined surface.

4. The adjustable length windshield wiper as claimed in claim 1, further comprising two caps coupled to said intermediate frame and engaged with respective ends of said wiper blade.

* * * * *